United States Patent
Chun et al.

(10) Patent No.: US 9,652,887 B2
(45) Date of Patent: May 16, 2017

(54) OBJECT ORIENTED IMAGE PROCESSING AND RENDERING IN A MULTI-DIMENSIONAL SPACE

(71) Applicant: Hankookin, Inc., Raleigh, NC (US)

(72) Inventors: James Jiwen Chun, Raleigh, NC (US); Andrew Youngho Chun, Raleigh, NC (US); Angela Soyoung Chun, Raleigh, NC (US); Jennifer Miseong Chun, Raleigh, NC (US)

(73) Assignee: HANKOOKIN, INC., Raleigh, NC (US)

( * ) Notice: Subject to any disclaimer, the term of this patent is extended or adjusted under 35 U.S.C. 154(b) by 56 days.

(21) Appl. No.: 14/601,290

(22) Filed: Jan. 21, 2015

(65) Prior Publication Data
US 2015/0206339 A1    Jul. 23, 2015

Related U.S. Application Data

(60) Provisional application No. 61/930,457, filed on Jan. 22, 2014.

(51) Int. Cl.
*G06T 15/00* (2011.01)
*G06T 15/20* (2011.01)

(52) U.S. Cl.
CPC .................. *G06T 15/205* (2013.01)

(58) Field of Classification Search
CPC .............................. H04N 1/64; G06T 15/205
USPC .......................................................... 345/419
See application file for complete search history.

(56) References Cited

U.S. PATENT DOCUMENTS

| | | | |
|---|---|---|---|
| 5,900,909 A | 5/1999 | Parulski et al. | |
| 7,893,963 B2 | 2/2011 | Gallagher et al. | |
| 8,379,955 B2 | 2/2013 | McKenzie et al. | |
| 8,451,346 B2 | 5/2013 | Free | |
| 8,588,469 B2* | 11/2013 | Hayashi | B60R 1/00 382/104 |
| 8,731,335 B2* | 5/2014 | Zheng | H04N 5/23277 358/3.26 |
| 8,786,751 B2* | 7/2014 | Kinoshita | H04N 5/23293 348/333.02 |
| 9,208,581 B2* | 12/2015 | Wexler | G01C 11/04 |
| 9,230,339 B2* | 1/2016 | Wexler | G06T 7/602 |
| 9,280,804 B2* | 3/2016 | Krishnaswamy | G06T 3/60 |

(Continued)

*Primary Examiner* — Phu K Nguyen
(74) *Attorney, Agent, or Firm* — Ash Tankha; Lipton, Weinberger & Husick

(57) ABSTRACT

A computer implemented method and an image processing system (IPS) for constructing and rendering an object oriented image (OOI) of a target object in an original spatial position and orientation of the target object are provided. While recording an image of a target object, the IPS records extended image data (EID), for example, spatial coordinates of an image recording device (IMR), multi-dimensional position and orientation of a line of vision of the IMR and the target object, etc. The IPS determines the original spatial position and orientation of the target object from the EID, constructs the OOI of the target object by repositioning and reorienting the recorded image based on the original spatial position and orientation of the target object, and renders the constructed OOI on an image display device. For constructing a three-dimensional OOI, the IPS records multiple images and the EID of the target object at multiple orientations.

30 Claims, 9 Drawing Sheets

(56) References Cited

U.S. PATENT DOCUMENTS

2005/0093891 A1  5/2005  Cooper
2012/0179983 A1  7/2012  Lemire

* cited by examiner

OBJECT ORIENTED IMAGE PROCESSING AND RENDERING IN A MULTI-DIMENSIONAL SPACE

CROSS REFERENCE TO RELATED APPLICATIONS

This application claims priority to and the benefit of provisional patent application No. 61/930,457 titled "Object Oriented Image Processing And Rendering In A Multi-dimensional Space", filed in the United States Patent and Trademark Office on Jan. 22, 2014. The specification of the above referenced patent application is incorporated herein by reference in its entirety.

BACKGROUND

Image capturing and recording of images has mostly advanced in terms of resolution of an image, pixels of an image, etc. However, recording, construction, and presentation of an image to a viewer have mostly been limited by default settings of an image capture device that captures the image. A user using an image capture device, for example, a camera for photography and/or for video recording of a target object, at times, fails to hold the camera level with the target object or tends to rotate or pivot the camera about an optical axis of the camera. Also, a user attempting to capture an image of a target object when the user is in motion, for example, while surfing, diving, bungee jumping, etc., tends to capture images randomly due to lack of time available to focus on the target object. Such factors comprising, for example, misalignment of a lens of the camera with respect to the target object, unfocused image capturing of the target object, etc., affect the quality of the captured image, thereby resulting in an image where the target object is off-centered, tilted, blurred, distorted, disoriented with respect to a background or a frame of the image, etc.

Even when a captured image is of high definition, that is, has a high resolution, the image may be incoherent if the image is disoriented, that is, if the image moves and shakes in different directions, for example, left and right or up and down on a screen when displayed, which makes it difficult for a human brain to perceive detailed information from the incoherent image. Conventional imaging systems fail to determine an original spatial position and original orientation of a target object being recorded. Accurate perception of a target object in a captured image by a viewer of the captured image requires reorienting, repositioning, and presenting the captured image on a display device in an original spatial position and an original orientation of the target object.

Hence, there is a long felt but unresolved need for a computer implemented method and an image processing system that construct and render an object oriented image of a target object in an original spatial position and an original orientation of the target object in a multi-dimensional space, while considering a position and an orientation of a viewer or an image recording device, and while maintaining image quality.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and the image processing system disclosed herein address the above mentioned needs for constructing and rendering an object oriented image of a target object in an original spatial position and an original orientation of the target object in a multi-dimensional space, while considering a position and an orientation of a viewer or an image recording device, and while maintaining image quality. The computer implemented method disclosed herein employs the image processing system comprising at least one processor configured to execute computer program instructions for constructing and rendering an object oriented image of a target object in an original spatial position and an original orientation of the target object.

The image processing system receives an image of the target object being recorded, from an image recording device. The image processing system, in communication with the image recording device and one or more auxiliary devices comprising, for example, a positioning device, an orientation indicator, etc., records extended image data during recording of the image of the target object. For each of the images recorded, the extended image data comprises, for example, exact time of recording of the image of the target object, spatial coordinates of the image recording device, multi-dimensional position and orientation of a line of vision of the image recording device, magnification and/or minimization of the image of the target object, multi-dimensional spatial coordinates and spatial orientation of the target object being recorded by the image recording device, etc. The image processing system, in communication with the image recording device and one or more auxiliary devices, obtains supplementary information comprising, for example, physical dimensions of the target object, a three-dimensional (3D) image of the target object, time dependent spatial motion of the target object, relative spatial relations between the image recording device and the target object, etc., using the recorded extended image data, and enhances the recorded extended image data with the supplementary information.

The image processing system determines an original spatial position and an original orientation of the target object in a multi-dimensional space from the recorded extended image data. The image processing system constructs the object oriented image of the target object by repositioning and reorienting the received image of the target object being recorded, based on the determined original spatial position and the original orientation of the target object. The image processing system renders the constructed object oriented image of the target object in the determined original spatial position and the determined original orientation of the target object on an image display device. The image display device therefore displays a recorded image in the original spatial position and the original orientation of the target object, thereby providing the viewer with a viewing experience that is near equivalent to viewing the target object in person with a human eye.

The computer implemented method and the image processing system disclosed herein also construct and render a three-dimensional (3D) object oriented image of a target object in an original spatial position and an original orientation of the target object. The image processing system receives multiple images of the target object being recorded at multiple different orientations from the image recording device. The image processing system, in communication with the image recording device and one or more auxiliary devices, records extended image data at each of the orientations of the image recording device, during the recording of the images of the target object. The image processing system determines an original spatial position and an original orientation of the target object in a multi-dimensional space from the recorded extended image data. The image processing system constructs the 3D object oriented image of the target object by repositioning and reorienting the received images of the target object being recorded, based on the determined original spatial position and the determined original orientation of the target object. The image processing system renders the constructed 3D object oriented image of the target object in the determined original spatial position and the determined original orientation of the target object on the image display device.

In one or more embodiments, related systems include but are not limited to circuitry and/or programming for effecting the methods referenced herein; the circuitry and/or programming can be any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
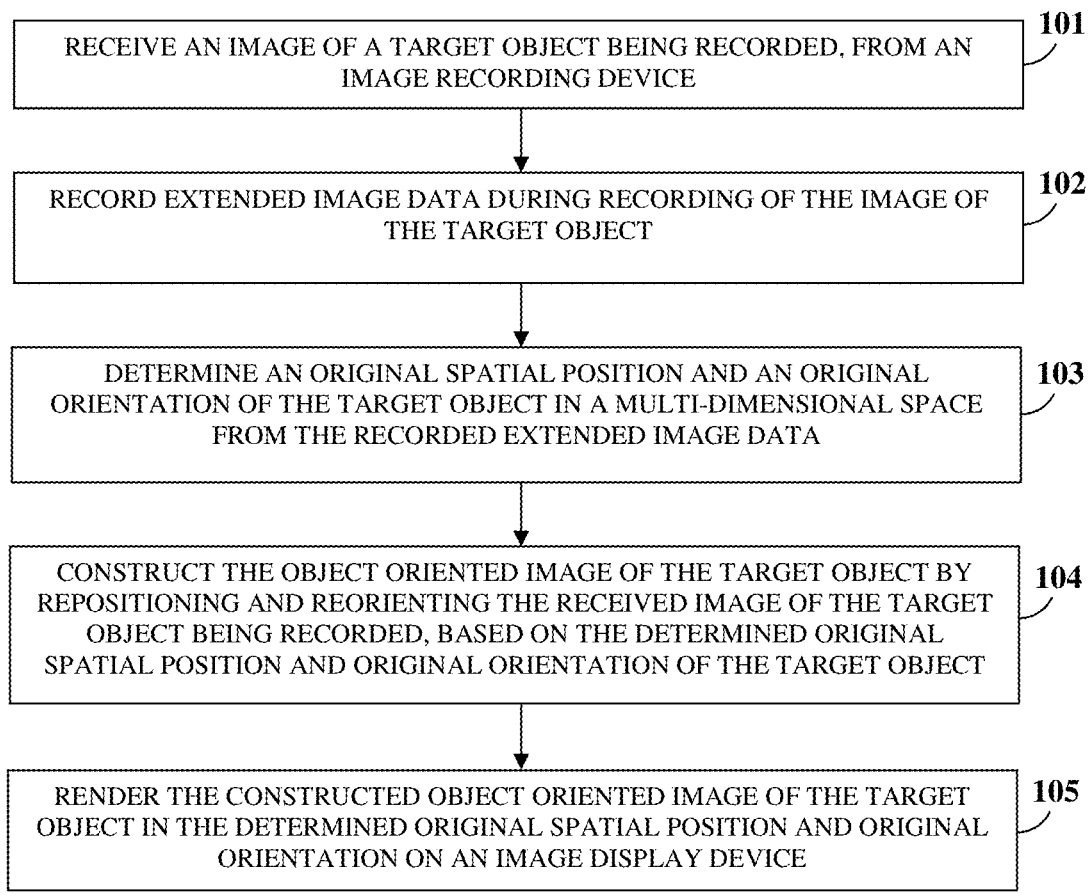
FIG. 1 illustrates a computer implemented method for constructing and rendering an object oriented image of a target object in an original spatial position and an original orientation of the target object.

FIG. 1 illustrates a computer implemented method for constructing and rendering an object oriented image of a target object in an original spatial position and an original orientation of the target object. As used herein, the term "rendering" refers to reconstructing and presenting or displaying an object oriented image of a target object on an image display device. Also, as used herein, "object oriented image" refers to an image of a target object in focus of an image recording device that records the image in a way that records the data to restore the original spatial position and the original orientation of the target object in a multi-dimensional space. An image of a target object comprises multiple pixels representing the target object. An object oriented image comprises the pixels grouped into multiple distinct objects based on one or more categorization parameters comprising, for example, a part of the target object, a function of a target object, a color of a target object, a shape of a target object, etc. Each of these distinct objects represents a part of the complete target object. Repositioning and reorienting these distinct objects allows configuration of the positioning and orientation of the image of the target object in a multi-dimensional space. The multi-dimensional space is, for example, a two-dimensional (2D) space, a three-dimensional (3D) space, etc. The image recording device is, for example, a digital camera, a camera embedded in a smart phone, a tablet computing device with an in-built camera such as the iPad® of Apple Inc., etc. The computer implemented method disclosed herein presents the image with respect to the position and the orientation of the original target object being recorded, and also presents the image of the target object with respect to the position and the orientation of viewers or of the image recording device. As used herein, the term "viewer" refers to a user who views the constructed object oriented images on an image display device.

With recent developments in three-dimensional (3D) positioning devices, the computer implemented method disclosed herein can be implemented using information recording features of tracking applications or auxiliary devices such as tracking devices, positioning devices, orientation indicators, etc., that can be embedded in the image recording device. The computer implemented method disclosed herein employs an image processing system comprising at least one processor configured to execute computer program instructions for constructing and rendering an object oriented image of a target object in an original spatial position and an original orientation of the target object in a multi-dimensional space. As used herein, "original spatial position" refers to an initial location of a target object in a multi-dimensional space, as defined by Cartesian coordinates. Also, as used herein, "original orientation" refers to an initial alignment of a target object in a multi-dimensional space. In an embodiment, the image processing system is configurable on an electronic device, for example, an image capture device such as a digital camera, a video camera, etc., a personal computer, a laptop, a tablet computing device with an in-built image recording device, a mobile phone with an in-built image recording device, a smart phone, a network enabled computing device, a wearable computing device such as Google Glass of Google Inc., a video recorder, a television, an interactive network enabled communication device, a gaming device, a theater system, any entertainment system, the image recording device, the image display device, any other suitable computing equipment, combinations of multiple pieces of computing equipment, etc. The electronic device may also be a hybrid device that combines the functionality of multiple devices, for example, a communication device, and/or the image recording device, and/or the image display device.

In another embodiment, the image processing system comprises an image processing application, which is a software application downloadable and executable on an electronic device, for example, a user device such as an image capture device, a personal computer, a laptop, a tablet computing device such as the iPad® of Apple Inc., a smart phone, a wearable computing device such as Google Glass of Google Inc., a network enabled computing device, an interactive network enabled communication device, a gaming device, a web browser, a theater system, any entertainment system, the image recording device, the image display device, any other suitable computing equipment, combinations of multiple pieces of computing equipment, etc. In another embodiment, the image processing system is accessible by a user device, the image recording device, and the image display device via a network, for example, the internet. In another embodiment, the image processing system is configured as a web based platform as disclosed in the detailed description of FIG. 8.

While an image is being recorded by the image recording device, the image processing system receives 101 the image of the target object from the image recording device. In an embodiment, the image recording device is external to the image processing system. In this embodiment, the externally connected image recording device records an image of the target object and transmits the recorded image to the image processing system via a network. In an embodiment, the image recording device records multimedia data comprising, for example, a video, an animation, etc., of the target object. In this embodiment, the image processing system obtains one or more images of the target object from the recorded multimedia data. The image processing system, in communication with the image recording device and one or more auxiliary devices, records 102 extended image data during the recording of the image of the target object. In an embodiment, the auxiliary devices operate directly with the image processing system and the image recording device. In another embodiment, the auxiliary devices are embedded or built into the image recording device. The auxiliary devices comprise, for example, positioning devices, orientation indicators, etc. The positioning devices, the orientation indicators, etc., provide spatial and orientation information, for example, spatial coordinates of the image recording device, multi-dimensional spatial coordinates and spatial orientation of the target object being recorded by the image recording device, etc.

The image processing system receives and records the spatial and orientation information from the auxiliary devices to record the extended image data. The extended image data comprises, for example, time of the recording of the image of the target object, spatial coordinates of the image recording device, multi-dimensional position and orientation of a line of vision of the image recording device, magnification and/or minimization of the image of the target object, multi-dimensional spatial coordinates and spatial orientation of the target object being recorded by the image recording device, etc. As used herein, "line of vision" of the image recording device refers to a straight lined vector along which a viewer views the target object via the image recording device. The line of vision is a vector comprising spatial coordinates of the intersection of an imaging plane of the target object with a focal axis of the image recording device, and multi-dimensional spatial coordinates of a direction of the focal axis of the image recording device as exemplarily illustrated in FIG. 3. The image processing system uses the auxiliary devices which are electronic devices comprising, for example, global positioning system devices, compasses based on the earth's magnetic field, electronic three-dimensional (3D) orientation indicators, etc., to electronically record the extended image data, for example, Cartesian coordinates of the line of vision by recording translational and rotational motions of the target object in focus. These auxiliary devices record the spatial coordinates of the image recording device and the orientation of the direction of the line of vision of the image recording device as the image is recorded.

The image processing system, in communication with the image recording device and one or more auxiliary devices, uses the recorded extended image data to obtain supplementary information comprising, for example, physical dimensions of the target object, a three-dimensional (3D) image of the target object, time dependent spatial motion of the target object, relative spatial relations between the image recording device and the target object, etc. The image processing system obtains the physical dimensions of the target object by setting reference points on the recorded image of the target object and performing one or more computational actions on the set reference points. The computational actions comprise, for example, measuring distances between the set reference points, scaling the measured distances to an actual size of the target object based on the recorded extended image data, etc. The image processing system uses geometrical information, for example, the spatial coordinates of the image recording device and the target object, from the recorded extended image data, to determine measurements of various physical dimensions of the target object. For example, the image processing system calculates physical dimensions of a target object such as a height of a person from the recorded image of the person, by applying one or more mathematical principles comprising, for example, trigonometry principles and geometry principles to the recorded extended image data comprising, for example, magnification of the lens, magnification of the recorded images, and the line of vision of the image recording device. The image processing system calculates the relative spatial relations between the image recording device and the target object, for example, distance between the image recording device and the target object by using, for example, spatial coordinates of the image recording device at two or more locations, and the lines of vision of the image recording device with respect to the target object when the image recording device is positioned at each of these locations, and applying mathematical principles such as triangular relations. The image processing system enhances the recorded extended image data with the obtained supplementary information.

The image processing system determines 103 an original spatial position and an original orientation of the target object in a multi-dimensional space from the recorded extended image data. This original spatial position and original orientation of the target object comprises spatial coordinates of the target object that define an original geographical position and orientation of the target object in the multi-dimensional space. For example, the positional spatial coordinates are represented in terms of Cartesian coordinates X, Y, and Z, and the orientation spatial coordinates are represented in terms of angles pitch (θ), roll (δ), and yaw (φ). These angles also define a trajectory of a motion of a target object in a multi-dimensional space that the image processing system can use to obtain the time dependent spatial motion of the target object. The image processing system uses the determined original spatial position and original orientation of the target object to convert the recorded image into an object oriented image of the target object in the original spatial position and the original orientation of the target object.

The image processing system constructs 104 the object oriented image of the target object by repositioning and reorienting the received image of the target object being recorded, based on the determined original spatial position and original orientation of the target object. In an embodiment, the constructed object oriented image is a two-dimensional (2D) image. The image processing system further stores the constructed object oriented image of the target object in the determined original spatial position and the original orientation in a memory unit of the image processing system. In an embodiment, the image processing system uses the stored object oriented image for constructing a three-dimensional (3D) object oriented image. As 3D images comprise a substantial amount of data when compared to 2D images, the image processing system determines 3D information required to construct a 3D object oriented image, from 2D object oriented images stored in the memory unit. The constructed 2D object oriented images can be stored and transported over a network, for example, the internet, to a remote location for construction of a 3D object oriented image at any point of time. With permission from users, the image processing system provides the extended image data for use by commercial organizations such as Google Inc., Facebook, Inc., etc., to reconstruct a 3D object oriented image in the same location of the target object that was recorded, and to provide a high level of information service.

The image processing system renders 105 the constructed object oriented image of the target object in the determined original spatial position and original orientation on an image display device, for example, an electronic visual display of the iPad® of Apple Inc., the Google glass of Google Inc., etc. The image processing system renders the constructed object oriented image, for example, as a two-dimensional (2D) image. In an embodiment, the image processing system renders, that is, displays the constructed object oriented image of the target object in the determined original spatial position and original orientation using spatial coordinates of the image display device, that is, by using a position and an orientation of the image display device in a multi-dimensional space. The image processing system uses the spatial coordinates of the image display device to display the object oriented images, for example, two-dimensional (2D) and three-dimensional (3D) images of target objects in their original spatial positions and orientations. In an example, the image processing system receives multiple 2D images of a target object from the image recording device at multiple orientations as exemplarily illustrated in FIG. 6, and constructs a 3D object oriented image of the target object in the original spatial position and the original orientation of the target object. If the target object is not present for subsequent image construction, the image processing system uses the constructed 3D object oriented image of the target object in the original spatial position and original orientation, and dimensions of the target object to render a 2D object oriented image at any viewing angle of the image display device, as if the target object is present at its original location. In some cases, if the original spatial position of the target object changes, that is, if the spatial information of the target object represents a new location, the image processing system maintains the rest of the information, for example, the extended image data associated with the target object intact, to render the object oriented image of the target object in the original spatial position and the original orientation of the target object.

In an embodiment, the image display device is external to the image processing system. In this embodiment, the image processing system transmits the constructed object oriented image to the image display device via a network. The network through which the image recording device and the image display device communicate with the image processing system is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the image processing system configures access elements on one or more regions of the rendered object oriented image of the target object. As used herein, "access element" refers to an element that directs and allows a user to access specific data stored and/or displayed in a location separate from the location of the element. The access elements comprise, for example, icons, hyperlinks, objects, graphics, text, etc. The access elements, for example, hyperlinks positioned in a file, on activation, for example, clicking, hovering, etc., redirect a user to data stored in a separate location in the same file, or in a separate file or object. The access elements, upon activation, render the regions of the rendered object oriented image of the target object in one or more viewing windows for enhanced access to the regions of the rendered object oriented image of the target object. The enhanced access comprises, for example, a magnified view of the regions, additional information about the regions, an interactive view of the regions where a specific region can be rotated and/or reoriented for an enhanced view, etc.

Consider an example where a user downloads and installs the image processing application of the image processing system on his/her user device, for example, an iPad® of Apple Inc., equipped with an image recording device such as an inbuilt camera, and a precision global positioning system. The user records an image of a target object, for example, a tree via the inbuilt camera of the iPad®. The user records extended image data by using the global positioning system of the iPad® during the recording of the image. The recorded extended data comprises, for example, the time of recording of the image of the tree, spatial coordinates of the iPad®, multi-dimensional position and orientation of a line of vision of the inbuilt camera, multi-dimensional spatial coordinates and spatial orientation of the tree being recorded, etc. The image processing system uses the recorded extended image data to obtain physical dimensions of the tree, a three-dimensional (3D) image of the tree, a distance between the iPad® and the tree, etc. The image processing system determines an original spatial position and an original orientation of the tree in a multi-dimensional space from the recorded extended image data. The image processing system constructs a two-dimensional (2D) object oriented image of the tree by repositioning and reorienting the recorded image of the tree being recorded, based on the original spatial position and the original orientation of the tree determined from the recorded extended image data. The image processing system renders the constructed 2D object oriented image of the tree in the original spatial position of the tree and renders a new 2D image at a new viewing orientation chosen by the image display device, for example, a visual display of the iPad®.

Figure 2:
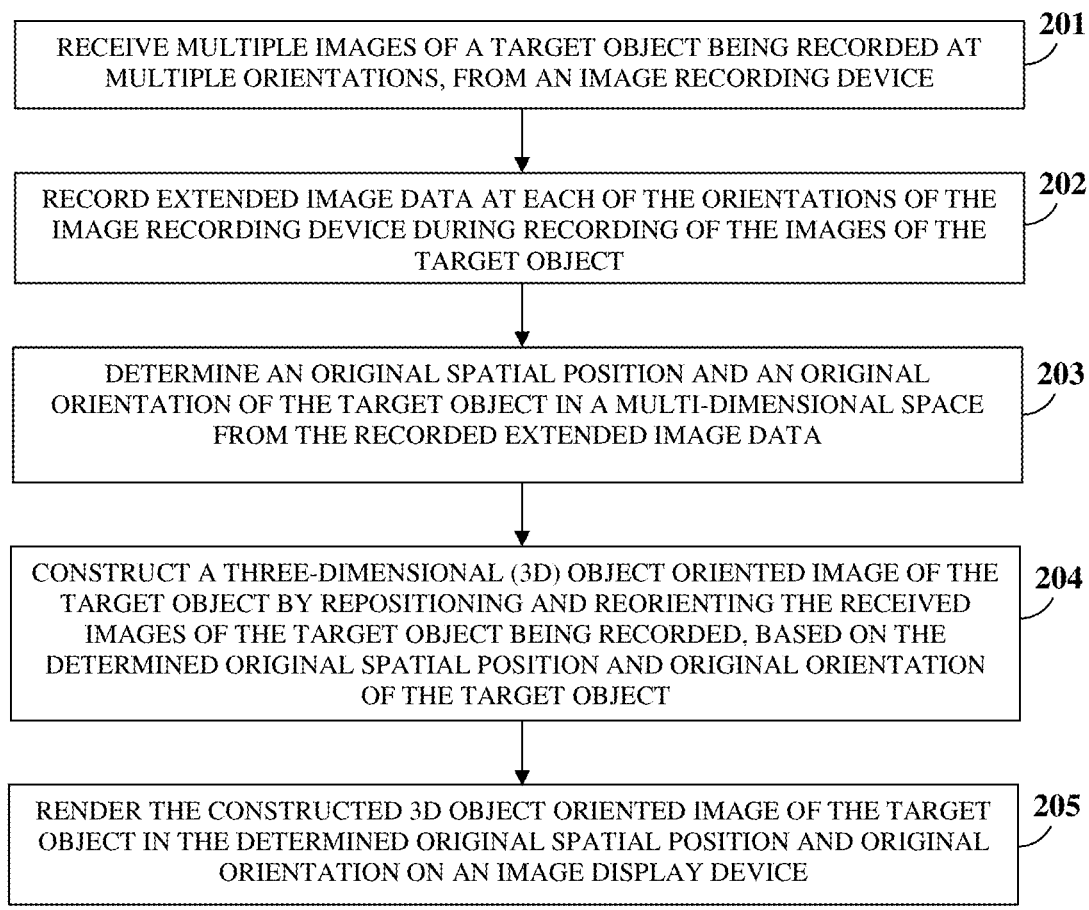
FIG. 2 illustrates a computer implemented method for constructing and rendering a three-dimensional object oriented image of a target object in an original spatial position and an original orientation of the target object.

FIG. 2 illustrates a computer implemented method for constructing and rendering a three-dimensional (3D) object oriented image of a target object in an original spatial position and an original orientation of the target object. The computer implemented method disclosed herein employs the image processing system comprising at least one processor configured to execute computer program instructions for constructing and rendering the 3D object oriented image of a target object in an original spatial position and an original orientation of the target object in a multi-dimensional space. The image processing system receives 201 multiple images of the target object being recorded at multiple orientations, from an image recording device. The image processing system, in communication with the image recording device and one or more auxiliary devices comprising, for example, positioning devices, orientation indicators, etc., records 202 extended image data at each of the orientations of the image recording device during recording of the images of the target object. The extended image data comprises, for example, two-dimensional (2D) image data which is comparatively smaller than 3D image data and is therefore an optimal format to be transmitted to remote sites for reconstruction of the smaller 2D extended image data into multi-dimensional images that comprise larger image data. The extended image data further comprises, for example, spatial coordinates of the image recording device at each of the orientations, multi-dimensional position and orientation of a line of vision of the image recording device at each of the orientations, magnification and/or minimization of each of the images of the target object, multi-dimensional spatial coordinates and spatial orientation of the target object being recorded by the image recording device at each of the orientations, etc. The image processing system determines 203 an original spatial position and an original orientation of the target object in a multi-dimensional space, for example, a 3D space, from the recorded extended image data.

The image processing system constructs 204 the three-dimensional (3D) object oriented image of the target object by repositioning and reorienting the received images of the target object being recorded, based on the determined original spatial position and the original orientation of the target object. The image processing system renders 205 the constructed 3D object oriented image of the target object in the determined original spatial position and the original orientation on an image display device. In an embodiment, the image processing system renders the constructed 3D object oriented image of the target object in the determined original spatial position and the original orientation using spatial coordinates of the image display device. In an example where the image display device such as a tablet computing device has built-in auxiliary devices such as a global positioning system (GPS) and an orientation indicator, the image display device uses its own position and orientation, defined by its spatial coordinates, in a 3D space to establish its line of vision in the 3D space in relation to the 3D object oriented image in the 3D space. In contrast to a conventional display that remains still, this image display device can be moved in the 3D space to obtain different views of the target object. Thus, this image display device acts as a slice of a tomographic viewer and browser in different orientations to display layers of the 3D object oriented image. Thus, this image display device allows a user to view and browse through the inside and outside of a virtual 3D object oriented image.

In another embodiment, the image processing system configures access elements on one or more regions of the rendered three-dimensional (3D) object oriented image of the target object. The access elements, upon activation, render one or more regions of the rendered 3D object oriented image of the target object in one or more viewing windows for enhanced access to the regions of the rendered 3D object oriented image of the target object. In this embodiment, the method of rendering the 3D object oriented images is used in web browsers, when the image processing system is implemented as a web based platform, for example, a website that renders a 3D object oriented image. In this embodiment, the image processing system configures access element such as hyperlinks onto regions or images of the rendered 3D object oriented image. On clicking a region or an image of the 3D object oriented image, the image processing system allows display of the clicked region or image in a new window of view of a relevant website.

In an embodiment, the image processing system stores the constructed three-dimensional (3D) object oriented image of the target object in the determined original spatial position and the original orientation in the memory unit of the image processing system for subsequent rendering of the 3D object oriented image. In another embodiment, the image processing system reconstructs the constructed 3D object oriented image of the target object in the determined original spatial position and the original orientation using the recorded extended image data as 3D scanning data. In another embodiment, the image processing system reconstructs the constructed 3D object oriented image of the target object in the determined original spatial position and the original orientation using a spatial relation and/or an orientation relation of the target object with respect to one or more surrounding objects proximal to the target object in the multi-dimensional space. The image processing system determines spatial relation and/or an orientation relation of the target object with respect to one or more surrounding objects proximal to the target object in the multi-dimensional space using one or more auxiliary devices, for example, a positioning device, an orientation indicator, etc. Once a 3D object oriented image is constructed, the image processing system uses the recorded extended image data, for example, spatial orientation and geometrical relations of the target object with respect to objects surrounding the target object to reconstruct the 3D object oriented image. The image processing system displays the constructed object oriented image either instantaneously as a two-dimensional (2D) image or as a 3D image after the 3D reconstruction.

In an embodiment, the image processing system integrates one or more supplementary three-dimensional (3D)

images of one or more surrounding objects with the reconstructed 3D object oriented image of the target object for generating an integrated 3D object oriented image of a 3D target scene in a 3D image system or a 3D environment. The integrated 3D object oriented image can be viewed and analyzed via an image display device. In an embodiment, the image processing system constructs a supplementary 3D image, that is, a 3D object oriented image of a surrounding object, for example, an object in proximity to, for example, in the background of the target object, in an original spatial position and an original orientation of the surrounding object. The image processing system creates, designs, and incorporates this supplementary 3D image with the reconstructed 3D object oriented image to generate the integrated 3D object oriented image representing a 3D target scene comprising the surrounding object in proximity to the target object. The image processing system performs this integration based on the extended image data of the target object and the surrounding object comprising, for example, spatial relations between the surrounding object and the target object.

In an embodiment, the image processing system generates and renders one or more views of the constructed three-dimensional (3D) object oriented image of the target object on an image display device. The views comprise, for example, an internal view and an external view. For rendering these views, in an embodiment, the image processing system generates two-dimensional (2D) image data of the views in one or more formats comprising, for example, a Joint Photographic Experts Group (JPEG) format, from the constructed 3D object oriented image based on the orientation of the image display device. In contrast to a conventional display that remains still, a 3D image display device can be positioned in the 3D space to render different views of the 3D target object. Thus, the image display device acts as a slice of a tomographic viewer and a browser of the different orientations and layers of the 3D image. Thus, this 3D image display device provides a method to view and browse through the inside and outside of a virtual 3D image.

Consider an example where a user downloads and installs the image processing application of the image processing system on his/her user device equipped with an image recording device and a precision global positioning system. The user records multiple images of a target object, for example, a bust sculpture, as exemplarily illustrated in FIG. 6, at multiple orientations via the image recording device and records extended image data at each of the orientations of the image recording device using the global positioning system. The image processing system determines an original spatial position and an original orientation of the bust sculpture in a multi-dimensional space from the recorded extended image data and constructs a three-dimensional (3D) object oriented image of the bust sculpture in the determined original spatial position and orientation of the bust sculpture by repositioning and reorienting each of the recorded images based on the determined original spatial position and orientation of the bust sculpture. The image processing system renders the constructed 3D object oriented image of the bust sculpture in the determined original spatial position and original orientation on an image display device of the user device or reconstructs the constructed 3D object oriented image in the original location, that is, a place where the bust sculpture was erected. The image processing system uses the orientation of the bust sculpture in a room where the bust sculpture was originally positioned, a spatial relation of the positioned bust sculpture with respect to a floor of the room or with respect to one or more surrounding objects in the room, etc., to reconstruct the 3D object oriented image of the bust sculpture. Even when the target object, that is, the bust sculpture is removed from the original location of erection of the bust sculpture, the image processing system uses the reconstructed 3D object oriented image to render a 3D object oriented image or a two-dimensional (2D) object oriented image on the image display device in one or more viewing angles of the image display device. For example, a user of the image display device orients the image display device in a direction pointing to the original location of the bust sculpture to render a 3D object oriented image of the target object on the image display device from a viewing angle of the image display device as if the bust sculpture is still present in the original location of erection of the bust sculpture.

While recording images, most recording events are targeted to certain objects at a certain time and place. Each series of recording images typically focus on a certain target object. The three-dimensional (3D) construction and display performed by the image processing system restores the position and orientation of the target object in a virtual world. The target object may be stationary or in motion but the image processing system constructs or reconstructs the object oriented image to restore the position and the orientation of the target object and keep track of the motion of the target object in a 3D space. When images are recorded via an image recording device, for example, a camera, a video recorder, etc., and are displayed, the images tend to disorient, for example, move up and down because of the motion of the image recording device. Unlike a human eye that mostly maintains a steady horizontal position, an image recording device can be held at any orientation angle. When these recorded images are displayed to a human eye, the perception changes as per the orientation of the image recording device and in turn, the orientation of the recorded image because the recorded image may be disoriented upside, downside, laterally, and may move up and down on a display screen. The human eye perceives images from a steady horizontal vision; therefore, construction and reorientation of the images as disclosed in the computer implemented method herein reduce the vibration and disorientation of the recorded images, and also increase clarity in the perception of the images.

Figure 3:
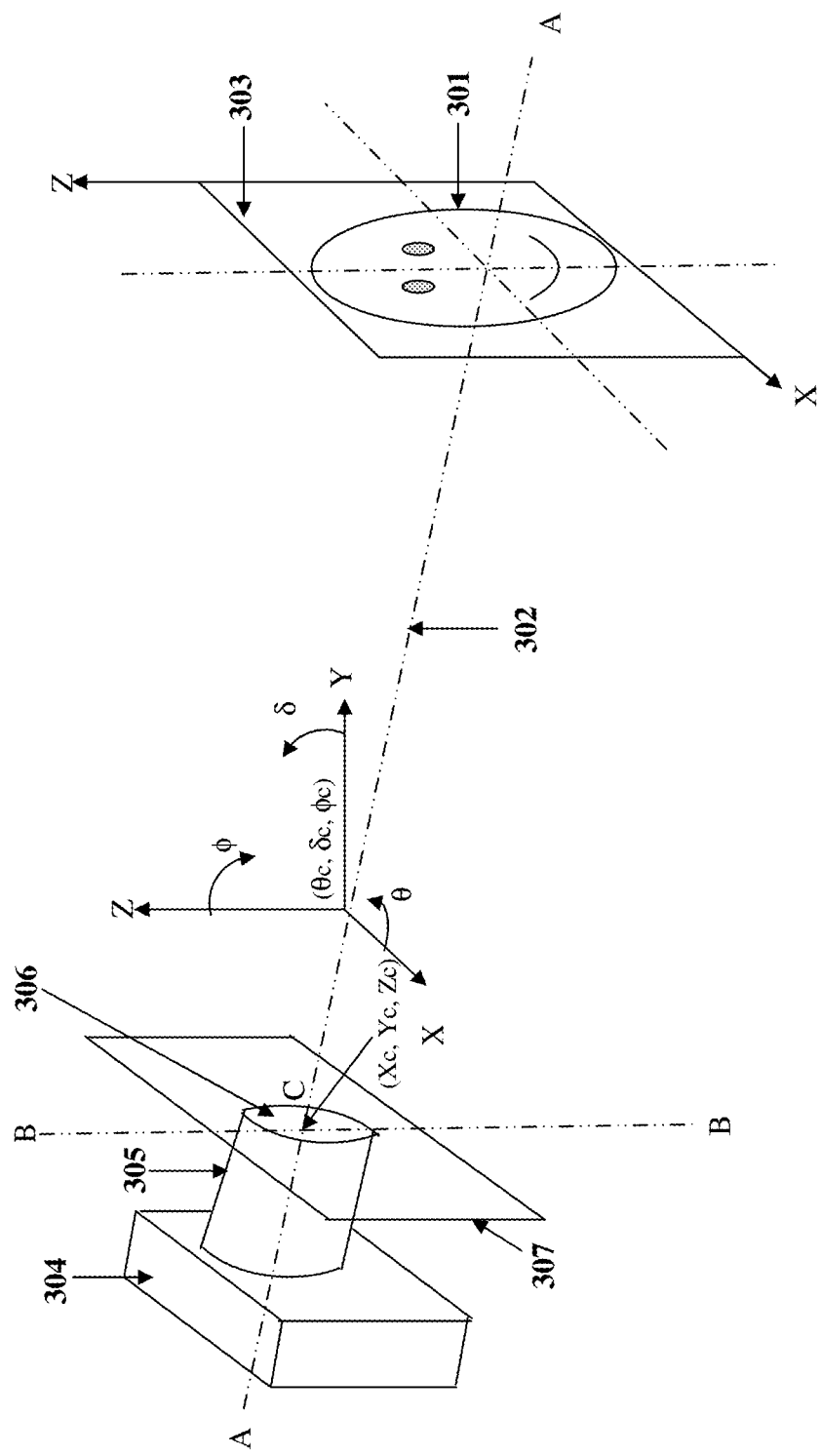
FIG. 3 exemplarily illustrates a line of vision of an image recording device.

FIG. 3 exemplarily illustrates a line of vision 302 of an image recording device 304. As exemplarily illustrated in FIG. 3, a target object 301 lying in a plane 303 is in focus of the image recording device 304. Although FIG. 3 exemplarily illustrates the target object 301 positioned centrally in the plane 303, the target object 301 may lie anywhere in the plane 303 in one or more embodiments. The position and the orientation of a camera head 305 of the image recording device 304 are defined by a vector called the line of vision 302. As exemplarily illustrated in FIG. 3, the Cartesian coordinates of the line of vision 302 in a three-dimensional (3D) space are $(X_C, Y_C, Z_C)$ and $(\theta_C, \delta_C, \phi_C)$. These Cartesian coordinates of the line of vision 302 comprise coordinates (Xc, Yc, Zc) of a crossing point C of the imaging plane 307 with a focal axis AA of the image recording device 304, and coordinates $(\theta_C, \delta_C, \phi_C)$ of 3D spatial dimensions and orientation of the focal axis AA of the image recording device 304 as exemplarily illustrated in FIG. 3. The crossing point C is a point of intersection of the axes of the imaging plane 307, for example, a vertical axis BB and the focal axis AA of the image recording device 304. Auxiliary devices comprising, for example, global positioning system devices, compasses based on the earth's magnetic field, and electronic 3D orientation indicators electronically record the Cartesian coordinates of the line of vision 302 by recording translational and rotational motions of the target object 301 in focus. These auxiliary devices record the spatial coordinates of the image recording device 304 and the 3D orientation of the direction of the line of vision 302 of the camera head 305 as the image is recorded. Lenses 306 of the image recording device 304 may magnify or minimize the image. The magnification and the minimization of the image are proportional to the relative distances of the lenses 306. A relative distance of the lens 306, for example, a focal length of the lens 306 allows an optical zoom in or an optical zoom out on the target object 301 in focus. In an embodiment, the image processing system obtains a non-optical magnification of an image by expanding pixel data in the image to achieve a larger viewing size of the image. The image processing system records an amount of pixel expansion as a parameter for the magnification of the image. The image processing system records the relative distances, the resulting magnification of the lenses 306, and the Cartesian coordinates of the line of vision 302 of the image recording device 304. Thus, the image processing system captures an image of the target object 301 at the focal point of the image recording device 304 both as the actual image data with the exact physical size and dimensions as well as the exact and accurate coordinates and spatial dimensions of the line of vision 302 of the image recording device 304.

The line of vision 302 of the image recording device 304 is recorded as the position of the crossing point C of the imaging plane 307 with the focal axis AA along the direction of the focal axis AA of the camera head 305 of the image recording device 304. The crossing point C of the imaging plane 307 with the focal axis AA has Cartesian coordinates $(X_C, Y_C, Z_C)$, and the direction of the focal axis AA of the camera head 305 of the image recording device 304 has Cartesian coordinates $(\theta_C, \delta_C, \phi_C)$. The line of vision 302 is perpendicular to the imaging plane 307 of the lens 306 of the camera head 305. The image processing system also calculates and records the distance between the image recording device 304 and the target object 301 at the focal point of the image recording device 304 using the focal distance of the lens 306. The focal distance of the lens 306 of the image recording device 304 is electronically recorded by the auxiliary devices.

Consider an example where an image recording device 304, for example, a camera records an image of a target object 301, the actual size, for example, a height of which is 900 mm. The magnification (m) of the camera lens 306 is defined as a ratio of a size of an image of a target object 301 to an actual size of the target object 301. Assuming that the size of an image of the target object 301 is 24 mm, the magnification (m)=24/900=0.0266≈0.03. An example formula showing the relation of the distance (u) between the image recording device 304 employing a single lens 306 and the target object 301 at the focal point of the image recording device 304 with the focal length (f) of the image recording device 304 is given below:

$$f = \frac{u}{\left(1 + \frac{1}{m}\right)}$$

If the target object 301 is positioned at a distance (u)=4000 mm from the image recording device 304, the focal length (f)={4000/[1+(1/0.03)]}=116.5 mm. Therefore, the focal length (f) of the image recording device 304 can be calculated by measuring the distance (u) between the image recording device 304 and the target object 301, or the distance (u) can be calculated if the focal length (f) is electronically recorded using the auxiliary devices.

The image processing system used the above calculations and data obtained from the auxiliary devices, for example, the positioning device, the orientation indicator, etc., to record the extended image data. The extended image data comprises, for example, the coordinates of the line of vision 302 of the image recording device 304, the coordinates of each recorded target object 301, magnification and/or minimization of the image of the target object 301, multi-dimensional spatial coordinates and spatial orientation of the target object 301 being recorded by the image recording device 304, etc. The image processing system uses the recorded extended image data to obtain, for example, physical dimensions of the target object 301, time dependent spatial motion of the target object 301, and relative spatial relations between the image recording device 304 and the target object 301. Using the time dependent spatial motion of the target object 301, the image processing system can track the motion of the target object 301 in a multi-dimensional space and determine a trajectory of the motion of the target object 301 to render the object oriented image of the target object 301 on an image display device. The rendered object oriented image moves with the same trajectory as that of the target object 301. The image processing system performs two phases of image reconstruction with the extended image data, for example, an instantaneous two-dimensional (2D) image reorientation as disclosed in the detailed description of FIG. 4, and a post recording three-dimensional (3D) image reconstruction as disclosed in the detailed description of FIG. 5.

Figure 4:
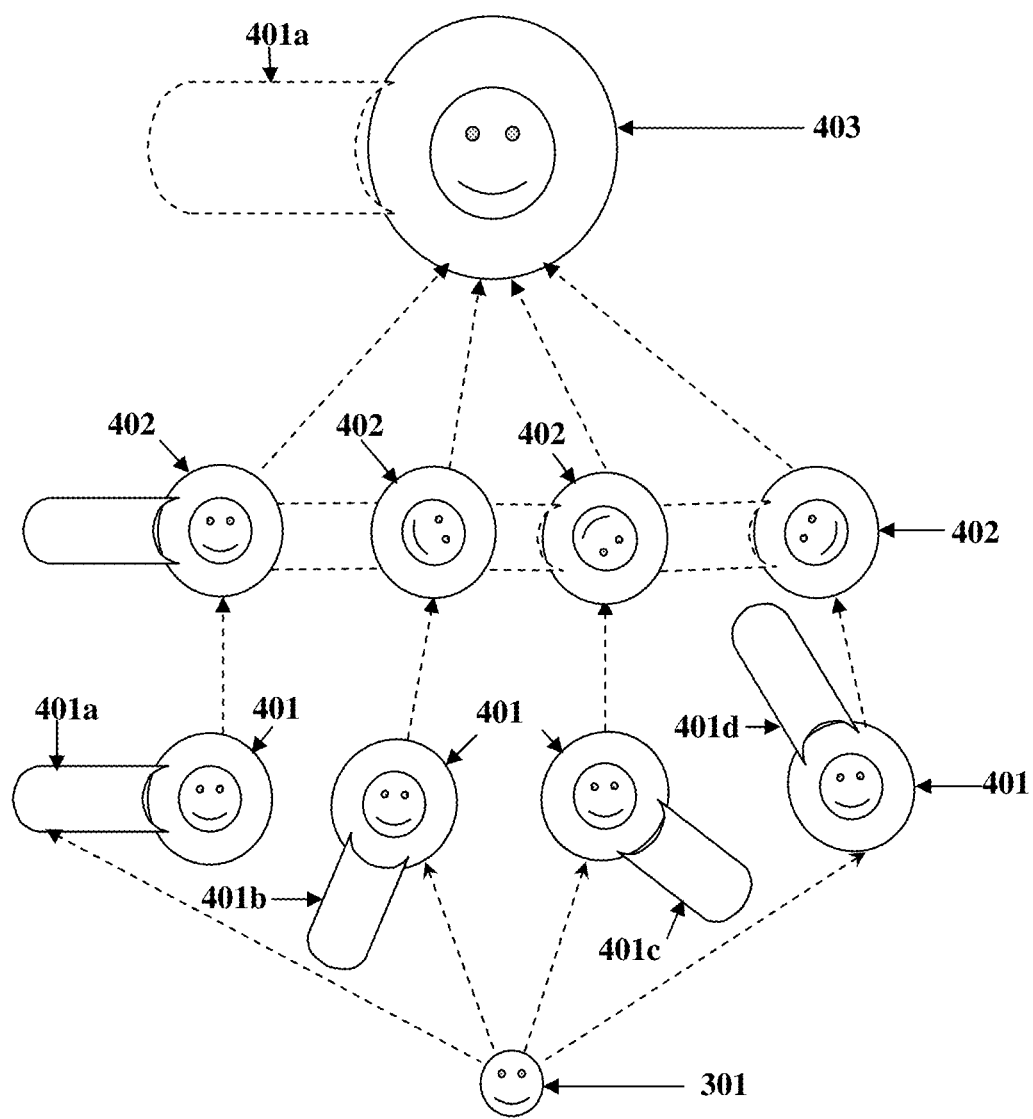
FIG. 4 exemplarily illustrates reorientation of an image of a target object for constructing an object oriented image of the target object.

FIG. 4 exemplarily illustrates reorientation of an image of a target object 301 for constructing an object oriented image of the target object 301. The image processing system receives images 401 of the target object 301 being recorded at multiple orientations 401a, 401b, 401c, and 401d from the image recording device 304 exemplarily illustrated in FIG. 3, and generates images 402 having multiple orientation angles. The lines of vision of the image recording device 304 with respect to the target object 301 are different at different orientations 401a, 401b, 401c, and 401d. Since the extended image data comprises orientation information obtained from auxiliary devices, for example, global positioning system devices, each of the recorded images 402 can be reoriented to an original orientation 401a of the target object 301. Thus, even though the image recording device 304 changes the orientation angles, the image processing system maintains a recorded image 403 at the same orientation angle based on the original orientation 401a of the target object 301 in a multi-dimensional space. As exemplarily illustrated in FIG. 4, the line of vision is originally set at a horizontal view orientation 401a of the target object 301. Although the image recording device 304 was moved and rotated in multiple orientations 401a, 401b, 401c, and 401d that resulted in disoriented images 402 recorded at multiple orientation angles, the image processing system maintains the final displayed image 403 in the same initial orientation 401a as the line of vision of the initial image of the target object 301. If a viewer does not need the image to be displayed instantaneously, the line of vision for each event or series of recordings can be set in an orientation as selected by the viewer and a new image can be constructed according to the extended image data recorded. The image processing system reconstructs a shaking image in multiple orientations 401a, 401b, 401c, and 401d into a steady horizontal image 403 with the initial orientation 401a. The computer implemented method disclosed herein can therefore be applied as an anti-vibrational function of the image recording device 304. Since the extended image data comprises the three-dimensional (3D) spatial information of the target object 301, the image processing system can reorient and construct the image 403 of the target object 301 for vertical, horizontal, and transverse positional changes, and magnification and minimization modifications using the extended image data.

Figure 5:
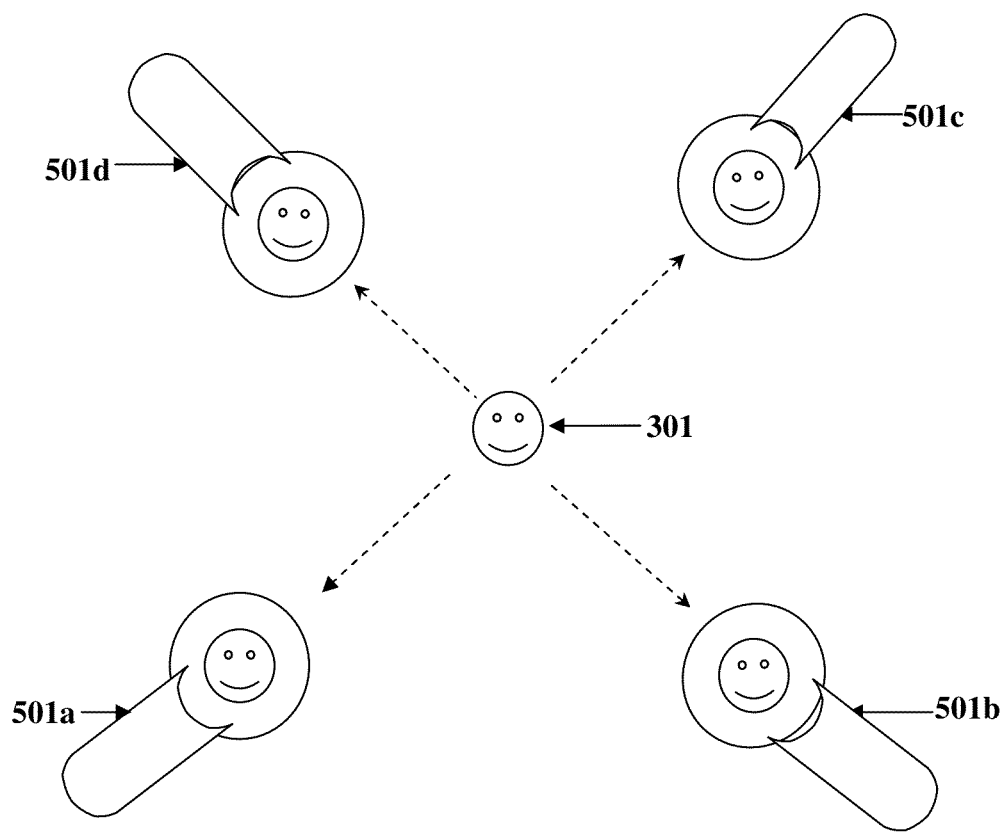
FIG. 5 exemplarily illustrates construction of an object oriented image of a target object in a multi-dimensional space.

FIG. 5 exemplarily illustrates construction of an object oriented image of a target object 301 in a multi-dimensional space. FIG. 5 exemplarily illustrates the process of reconstructing an object oriented image in a three-dimensional (3D) space after recording two-dimensional (2D) images at multiple orientations 501a, 501b, 501c, and 501d. The image processing system disclosed herein implements enhanced 3D technologies for converting 2D images into a 3D image, for example, using photometric principles. The image processing system implements multiple algorithms that propose methods for constructing 3D images from 2D images of a target object 301 that are recorded at multiple orientation angles based on photogrammetry, for example, by using Photomodeler® of Eos Systems Inc., a software application that performs image based modeling and close range photogrammetry for producing 3D models and measurements of a target object 301 from 2D photography of the target object 301. In an embodiment, the image processing system is operably coupled to a 3D scanner for implementing one such algorithm. The 3D scanner comprises one or more cameras that can rotate in a predetermined trajectory relative to the target object 301 at a series of orientation angles to construct an accurate 3D image of the target object 301.

In an embodiment, the image processing system employs an extended image data recording device that acts as a three-dimensional (3D) scanner and provides extended image data. In an embodiment, the extended image data recording device is embedded in the image recording device 304. In this embodiment, the image recording device 304 comprises, for example, a modified flat screen equipped with a precision global positioning system, a compass based on the earth's magnetic field, a 3D orientation indicator. The extended image data recording device provides a series of two-dimensional (2D) images and provides 3D information of the position and orientation of the camera head 305 exemplarily illustrated in FIG. 3, for each 2D image to construct 3D images based on the extended image data. A conventional 3D scanner scans the target object 301 in its scanning field only. This scanning field is typically limited by a rotational axis of the 3D scanner. The extended image data recording device can be used in any area for any target object 301, and is not limited by the rotational axis of a scanning device of the extended image data recording device. The extended image data recording device therefore provides a greater number of 2D images compared to the 3D scanner with orientation angle restrictions, and performs 3D scanning to produce complete and accurate 3D images. The extended image data recording device is easier to use than the 3D scanner because the extended image data recording device does not require scanner equipment. Commercial software can be developed to construct 3D images based on the extended image data.

Figure 6:
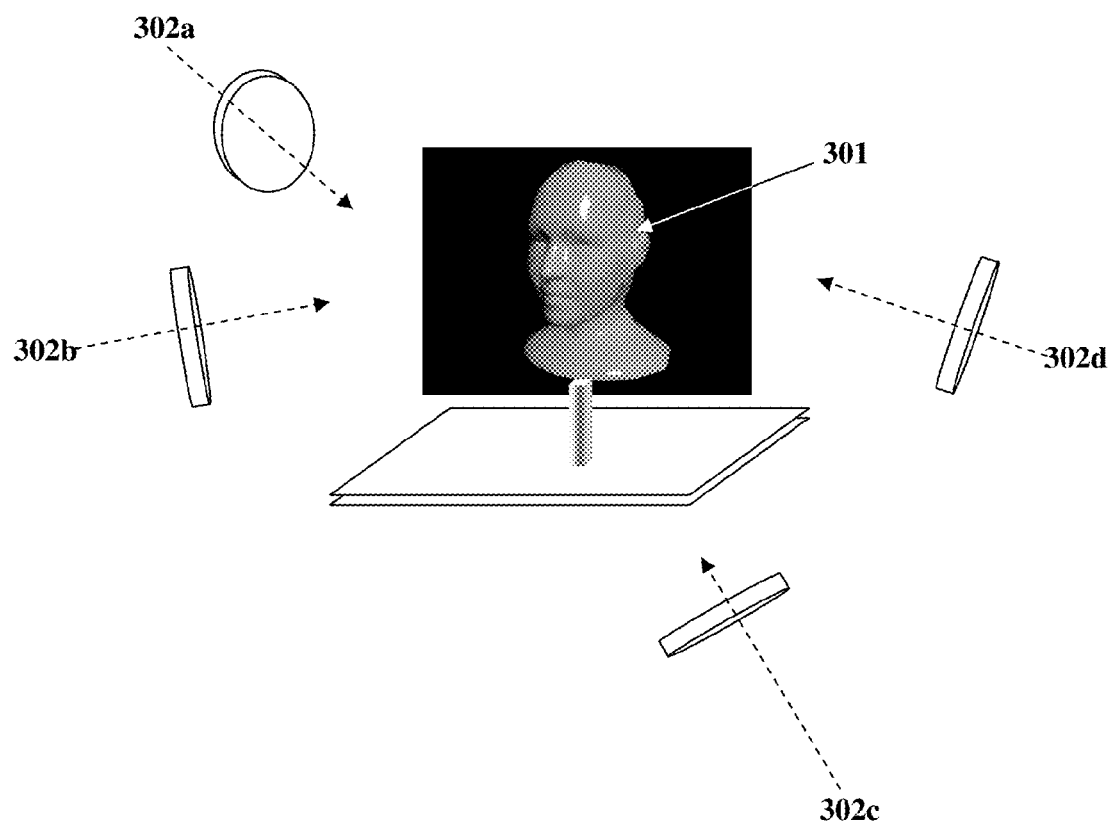
FIG. 6 exemplarily illustrates multiple lines of vision for viewing an image of a target object in a multi-dimensional space at multiple orientation angles.

FIG. 6 exemplarily illustrates multiple lines of vision 302a, 302b, 302c, and 302d for viewing an image of a target object 301 in a multi-dimensional space at multiple orientation angles. Since the extended image data comprises the complete three-dimensional (3D) spatial information of the target object 301, the 3D image of the target object 301 can be constructed in the original spatial position and orientation of the target object 301. The constructed 3D image is independent of the image recording device 304, exemplarily illustrated in FIG. 3, and the image display device. The image display device is used to display the 3D image in a 3D space. The 3D image remains at the same position as the original target object 301. A viewer can select a line of vision 302a, 302b, 302c, or 302d from multiple lines of vision 302a, 302b, 302c, and 302d to view the 3D image in the 3D space in any chosen direction. The viewer may change the line of vision of the image display device, but the 3D image remains in the same position as the original target object 301. If the target object 301 is moving in the 3D space, the image processing system records extended image data of the target object 301 comprising information regarding motion and trajectory of the target object 301 in the 3D space. This motion is independent of the line of vision 302a, 302b, 302c, or 302d of the image recording device 304. The constructed 3D image will move in the same trajectory as the original target object 301. The viewer can change his/her line of vision to better record the motion of the 3D object.

Figure 7:
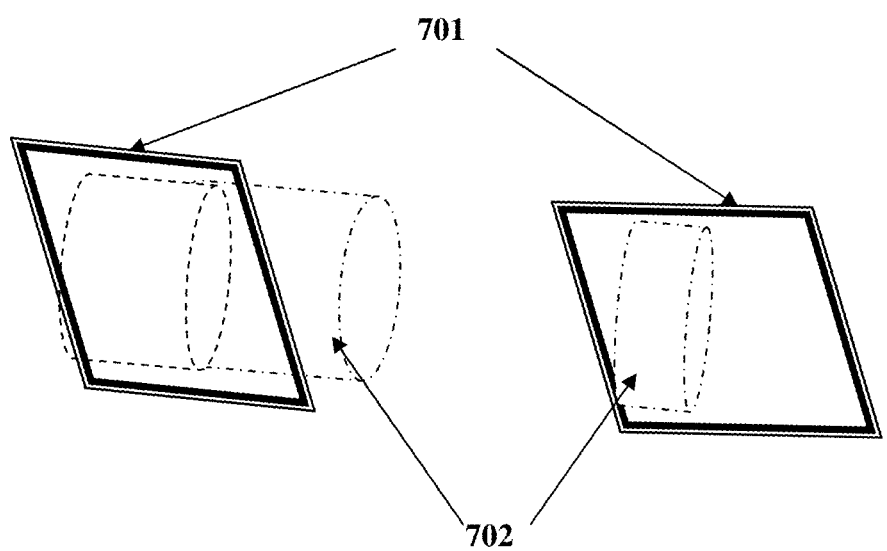
FIG. 7 exemplarily illustrates restoration and rendering of a three-dimensional object oriented image of a target object in an original spatial position and an original orientation of the target object on an image display device, when the image display device is moved to view different aspects of the three-dimensional object oriented image of the target object.

FIG. 7 exemplarily illustrates restoration and rendering of a three-dimensional (3D) object oriented image 702 of a target object in an original spatial position and an original orientation of the target object on an image display device 701, when the image display device 701 is moved to view different aspects of the 3D object oriented image 702 of the target object. In each event or series of image recording, the image processing system first establishes a line of vision for displaying a subsequent series of 3D object oriented images 702, until a new line of vision is set for a new position and orientation. The image processing system reorients subsequent 3D object oriented images 702 to the newly established line of vision so that a steady horizontal image is displayed throughout the sequent recorded 3D object oriented images 702. The image processing system displays the subsequent 3D object oriented images 702 on the image display device 701.

The three-dimensional (3D) object oriented images 702 of the target object in the image display device 701 remain steady and horizontal at the same position while a border of a display window on the image display device 701 and a surrounding background may move in an upward direction and a downward direction. Since a human eye typically perceives the 3D object oriented images 702 of the target object and not the border of the display window or the surrounding background, this computer implemented method of rendering or displaying the 3D object oriented images 702 of the target object helps a viewer to easily perceive the target object. If the 3D object oriented images 702 of the target object are outside the border of the display window, the image processing system establishes a new line of vision to capture the target object in the new display window. The re-establishment of the line of vision can be performed, for example, by moving the display window to a new position on the image display device 701 or moving the image display device 701 to the new position. For example, if the image display device 701 is an iPad® of Apple Inc., the display window can slide to the new position or the iPad® can be moved in an upward direction and a downward direction to the new position by a viewer. Since the image display device 701 such as a modified iPad® has a global positioning system, a compass based on the earth's magnetic field, and a 3D orientation indicator, the image display device 701 can use its own position and orientation in the 3D space to establish its line of vision in the 3D space in relation to the 3D object oriented image 702 in the 3D space.

The image processing system can set the three-dimensional (3D) spatial coordinates of the image display device 701 for display of the 3D object oriented image 702 to any desired point of origin such as the viewer's position. The image processing system then configures the 3D object oriented image 702 to be displayed according to the point of origin. The image display device 701 such as a 3D viewing device detects the relative position of the image display device 701 as the point of origin and establishes a new line of vision to view the 3D object oriented images 702. Using the new line of vision, the image processing system generates the 3D object oriented images 702 from this new line of vision based on the position of the image display device 701. If a particular angle of view for the 3D object oriented image 702 is desired, the image display device 701 can be moved to the new position and the new line of vision to obtain the desired angle of viewing of the 3D object oriented image 702. In an embodiment, a wearable image display device, for example, the Google glass of Google Inc., can be used to view the 3D object oriented image 702 of the target object directly to obtain the desired angle of viewing of the 3D object oriented image 702. As 3D object oriented images 702 comprise a large amount of data, a resolution control is recommended. At any angle of view, the image processing system first establishes a basic resolution with a small amount of data. If a high resolution is needed, the image processing system sets the control to the desired resolution and generates the corresponding 3D object oriented image 702.

The image processing system stores the constructed three-dimensional (3D) object oriented image 702, for example, on the iPad® or the iCloud® unit of Apple Inc. In a view mode, the image processing system registers the position and orientation of the image display device 701 to instantaneously update the registered position and orientation of the image display device 701 into a 3D image system. The image processing system establishes the line of vision in the 3D image system for the display of the 3D object oriented image 702 in the 3D space. The image processing system generates the 3D object oriented image 702 from this line of vision and displays the 3D object oriented image 702 on the image display device 701. If the position and orientation of the image display device 701 change, the image processing system establishes a new line of vision, generates a new 3D object oriented image 702, and displays the newly generated 3D object oriented image 702 on the image display device 701. The image processing system via the image display device 701 therefore enables a viewer to explore details of the 3D object oriented image 702. The image processing system provides a method to view or browse the 3D object oriented image 702 with a handheld unit such as the iPad®. As exemplarily illustrated in FIG. 7, the 3D object oriented images 702 do not move, but the image display device 701 displays multiple views of the 3D object oriented images 702, for example, by moving with respect to the 3D object oriented images 702 to enable a viewer to view different aspects of the 3D object oriented images 702. The image processing system can also magnify the 3D object oriented images 702 being displayed by constructing new 3D object oriented images 702 of a large size.

Figure 8:
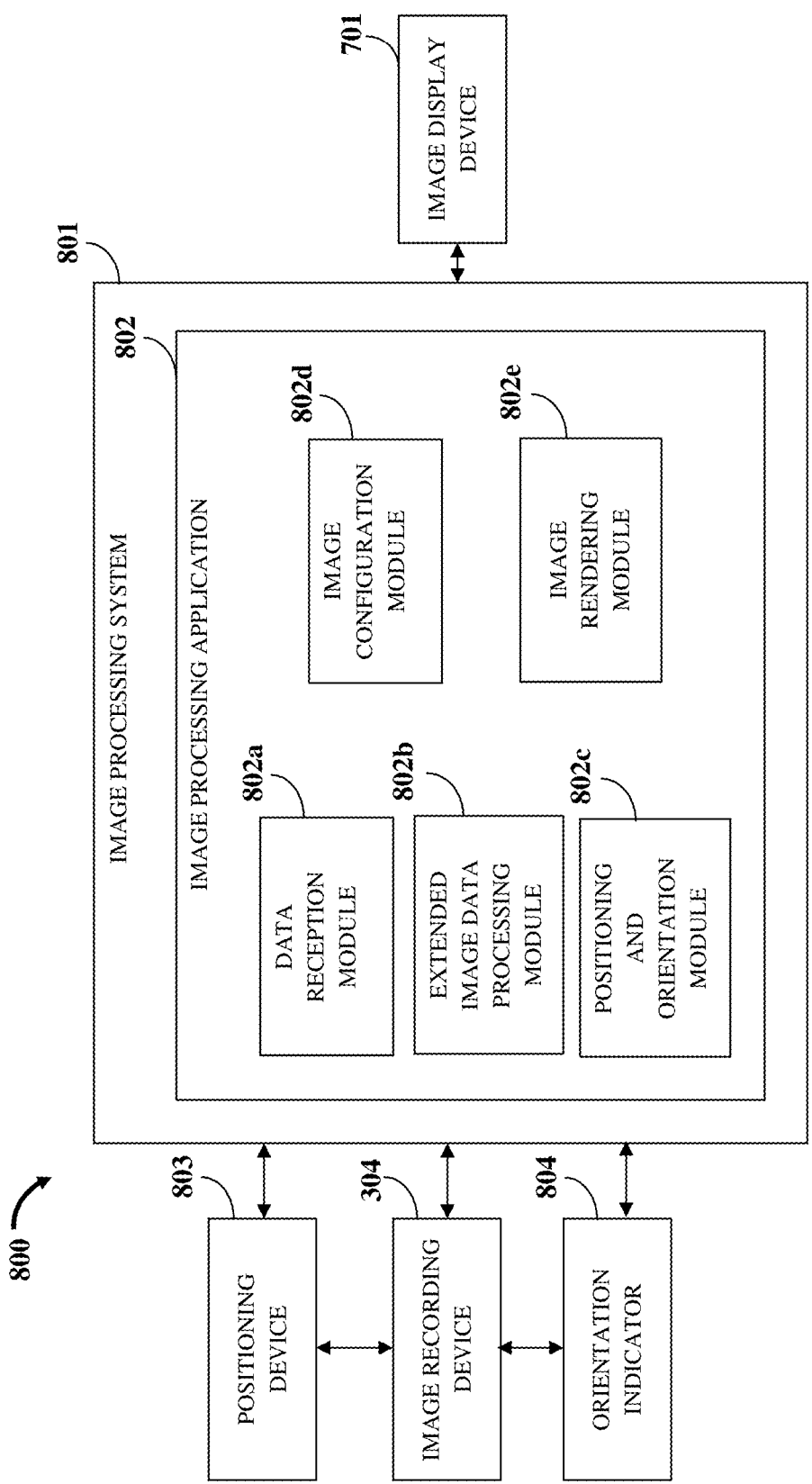
FIG. 8 exemplarily illustrates a computer implemented system for constructing and rendering an object oriented image of a target object in an original spatial position and an original orientation of the target object.

FIG. 8 exemplarily illustrates a computer implemented system 800 for constructing and rendering an object oriented image of a target object in an original spatial position and an original orientation of the target object. The computer implemented system 800 disclosed herein comprises the image processing system 801 in communication with an image recording device 304 and an image display device 701. The image processing system 801 is accessible to users, for example, through a broad spectrum of technologies and devices such as personal computers with access to the internet, network enabled cellular phones, global positioning system (GPS) enabled cellular phones, tablet computing devices, etc. The image recording device 304 is, for example, a digital camera, a camera embedded in a smart phone, a tablet computing device with an in-built camera such as the iPad® of Apple Inc., etc. The image display device 701 is, for example, a display screen of a smart phone, a display screen of an image recording device, a display screen of an electronic device such as a personal computer, a laptop, a tablet computing device, a mobile phone, television, etc., a graphical user interface of a web browser, etc. The image display device 701 displays information, images, access elements, windows, etc., for allowing a user to view the rendered object oriented image, activate access elements configured on the rendered object oriented image, view a three-dimensional (3D) object oriented image in one or more views comprising, for example, an internal view and an external view, etc. In an embodiment, the image display device 701 comprises, for example, a liquid crystal display, a plasma display, an organic light emitting diode (OLED) based display, etc. In another embodiment, the image display device 701 comprises a graphical user interface, for example, a display interface of the image processing system 801, an online web interface, a web based downloadable application interface, a mobile based downloadable application interface, etc.

In an embodiment, the image processing system 801, the image recording device 304, and the image display device 701 are incorporated in a single electronic device, for example, a tablet computing device such as the iPad® of Apple Inc. The image processing system 801 further communicates with auxiliary devices, for example, a positioning device 803 and an orientation indicator 804 for receiving and recording the extended image data. In an embodiment, the positioning device 803 and the orientation indicator 804 are externally connected to the image recording device 304 and the image processing system 801. In another embodiment, the positioning device 803 and the orientation indicator 804 are built-into the image recording device 304, for example, the iPad® of Apple Inc.

In an embodiment, the image processing system 801 is configured to operate as a software as a service (SaaS). In another embodiment, the image processing system 801 is configured as a web based platform, for example, a website hosted on a server or a network of servers. In another embodiment, the image processing system 801 is configured to operate, for example, as a platform as a service (PaaS) implemented in a cloud computing environment. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. In an embodiment, the image processing system 801 is a cloud computing based platform implemented as a service for constructing and rendering an object oriented image of a target object in an original spatial position and an original orientation of the target object. In these embodiments, the image processing system 801 is accessible to the image recording device 304, the image display device 701, and the auxiliary devices via a network, for example, the internet. In another embodiment, the image processing system 801 is developed on a local database server or a remote database server. In another embodiment, the image processing system 801 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. Many computations that the image processing system 801 perform are, for example, vectorized and parallelized in large main frame server computers and the object oriented images that the image processing system 801 constructs can be transferred back to local servers and/or the image display device 701 for reconstruction and/or viewing.

The image processing system 801 disclosed herein comprises a non-transitory computer readable storage medium such as a memory unit, and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium stores computer program instructions defined by modules, for example, 802a, 802b, 802c, 802d, 802e, etc., of the image processing system 801. The processor is configured to execute the defined computer program instructions.

As exemplarily illustrated in FIG. 8, the image processing system 801 comprises an image processing application 802 executable by at least one processor configured to construct and render an object oriented image of a target object in an original spatial position and an original orientation of the target object. The image processing application 802 defines the computer program instructions for implementing the method disclosed herein. The image processing application 802 comprises a data reception module 802a, an extended image data processing module 802b, a positioning and orientation module 802c, an image configuration module 802d, and an image rendering module 802e. The data reception module 802a receives an image of the target object being recorded, from the image recording device 304. The extended image data processing module 802b, in communication with the image recording device 304 and one or more auxiliary devices, for example, the positioning device 803 and the orientation indicator 804, records extended image data during the recording of the image of the target object. The extended image data processing module 802b, in communication with the image recording device 304 and one or more auxiliary devices, for example, the positioning device 803 and the orientation indicator 804, obtains supplementary information comprising, for example, physical dimensions of the target object, a three-dimensional (3D) image of the target object, time dependent spatial motion of the target object, relative spatial relations between the image recording device 304 and the target object, etc., using the recorded extended image data. The extended image data processing module 802b enhances the recorded extended image data with the supplementary information.

The positioning and orientation module 802c determines the original spatial position and the original orientation of the target object in a multi-dimensional space from the recorded extended image data. The image configuration module 802d constructs the object oriented image of the target object by repositioning and reorienting the received image of the target object being recorded, based on the determined original spatial position and the original orientation of the target object. The image rendering module 802e renders the constructed object oriented image of the target object in the determined original spatial position and the original orientation on the image display device 701. In an embodiment, the image configuration module 802d configures access elements on one or more regions of the rendered object oriented image of the target object. In this embodiment, the access elements, upon activation, render the regions of the rendered object oriented image of the target object in one or more viewing windows on the image display device 701 for enhanced access to the regions of the rendered object oriented image of the target object. In this embodiment, a user views the object oriented image on the image display device 701.

In an embodiment, the data reception module 802a receives multiple images of the target object being recorded at multiple orientations, while the extended image data processing module 802b records the extended image data at each of the orientations during the recording of the images of the target object. In this embodiment, the image configuration module 802d constructs a three-dimensional (3D) object oriented image of the target object by repositioning and reorienting the received images of the target object being recorded, based on an original spatial position and an original orientation of the target object in the multi-dimensional space that the positioning and orientation module 802c determines from the extended image data of the target object being recorded at each of the orientations. The image rendering module 802e renders the constructed 3D object oriented image of the target object in the determined original spatial position and the original orientation on the image display device 701. In an embodiment, the image rendering module 802e renders the constructed 3D object oriented image of the target object in the determined original spatial position and the original orientation using spatial coordinates of the image display device 701. In another embodiment, the image configuration module 802d generates and renders one or more views comprising, for example, an internal view and an external view of the constructed 3D object oriented image of the target object.

In an embodiment, the image configuration module 802d reconstructs the constructed three-dimensional (3D) object oriented image of the target object in the determined original spatial position and the original orientation using a spatial relation and/or an orientation relation of the target object with respect to one or more surrounding objects proximal to the target object in the multi-dimensional space. In an embodiment, the image configuration module 802d integrates one or more supplementary 3D images of one or more surrounding objects with the reconstructed 3D object oriented image of the target object for generating an integrated 3D object oriented image of a 3D target scene.

Figure 9:
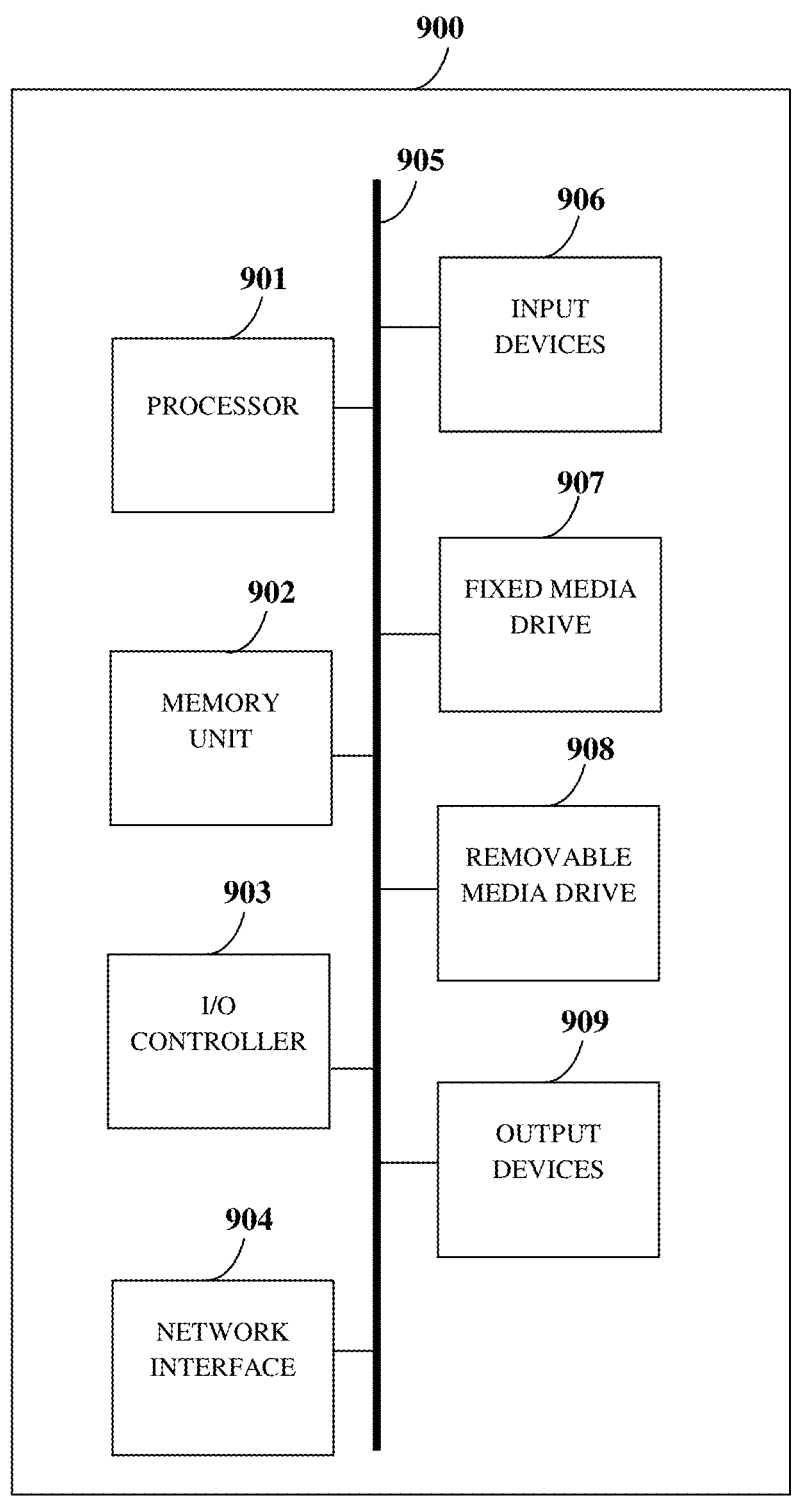
FIG. 9 exemplarily illustrates the hardware architecture of an image processing system employed for constructing and rendering an object oriented image of a target object in an original spatial position and an original orientation of the target object.

FIG. 9 exemplarily illustrates the hardware architecture 900 of the image processing system 801 exemplarily illustrated in FIG. 8, employed for constructing and rendering an object oriented image of a target object in an original spatial position and an original orientation of the target object. In an embodiment, the image processing system 801 is a computer system that is programmable using a high level computer programming language. The image processing system 801 may be implemented using programmed and purposeful hardware. In an embodiment, the image processing application 802 of the image processing system 801 exemplarily illustrated in FIG. 8, is installed and accessible on user devices (not shown) of users, for example, professional photographers, amateur photographers, etc., via a network, for example, a short range network or a long range network.

As exemplarily illustrated in FIG. 9, the hardware architecture 900 of the image processing system 801 comprises a processor 901, a non-transitory computer readable storage medium such as a memory unit 902 for storing programs and data, an input/output (I/O) controller 903, a network interface 904, a data bus 905, input devices 906, a fixed media drive 907 such as a hard drive, a removable media drive 908 for receiving removable media, output devices 909, etc. The processor 901 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 901 may also be implemented as a processor set comprising, for example, a general purpose microprocessor and a math or graphics co-processor. The processor 901 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The image processing system 801 disclosed herein is not limited to employing a processor 901. The image processing system 801 may also employ a controller or a microcontroller. The processor 901 executes the modules, for example, 802a, 802b, 802c, 802d, 802e, etc., of the image processing system 801.

The memory unit 902 is used for storing programs, applications, and data. For example, the data reception module 802a, the extended image data processing module 802b, the positioning and orientation module 802c, the image configuration module 802d, the image rendering module 802e, etc., are stored in the memory unit 902 of the image processing system 801. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The image processing system 801 further comprises a read only memory (ROM) or another type of static storage device that stores static information and instructions for the processor 901. The I/O controller 903 controls input actions and output actions performed by the image processing system 801.

The network interface 904 enables connection of the image processing system 801 to the network. In an embodiment, the network interface 904 is provided as an interface card also referred to as a line card. The network interface 904 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 905 permits communications between the modules, for example, 802a, 802b, 802c, 802d, 802e, etc., of the image processing system 801.

The input devices 906 are used for inputting data into the image processing system 801. The users use input devices 906 to provide inputs to the image processing system 801. For example, a user may upload one or more two-dimensional (2D) images recorded by the image recording device 304 exemplarily illustrated in FIG. 3 and FIG. 8, enter values for the extended image data, etc., using the input devices 906. The input devices 906 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the image processing system 801. The programs are loaded onto the fixed media drive 907 and into the memory unit 902 of the image processing system 801 via the removable media drive 908. In an embodiment, the computer applications and programs may be loaded directly via the network. Computer applications and programs are executed by double clicking a related icon displayed on the image display device 701 exemplarily illustrated in FIG. 8, using one of the input devices 906. The output devices 909 output the results of operations performed by the image processing system 801. For example, the image processing system 801 provides the extended image data and customized reports to users using the output devices 909. The image processing system 801 displays the generated reports using the output devices 909. The customized reports comprise, for example, an analysis of the extended image data of multiple images of a target object recorded at multiple orientations, time of recording of each of the images, magnification and minimization of each of the images, etc.

The processor 901 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The image processing system 801 employs the operating system for performing multiple tasks. The operating system is responsible for management and coordination of activities and sharing of resources of the image processing system 801. The operating system further manages security of the image processing system 801, peripheral devices connected to the image processing system 801, and network connections. The operating system employed on the image processing system 801 recognizes, for example, inputs provided by the users using one of the input devices 906, the output display, files, and directories stored locally on the fixed media drive 907. The operating system executes different programs using the processor 901. The processor 901 and the operating system together define a computer system for which application programs in high level programming languages are written.

The processor 901 of the image processing system 801 retrieves instructions defined by the data reception module 802a, the extended image data processing module 802b, the positioning and orientation module 802c, the image configuration module 802d, the image rendering module 802e, etc., for performing respective functions disclosed in the detailed description of FIG. 8. The processor 901 retrieves instructions for executing the modules, for example, 802a, 802b, 802c, 802d, 802e, etc., of the image processing system 801 from the memory unit 902. A program counter determines the location of the instructions in the memory unit 902. The program counter stores a number that identifies the current position in the program of each of the modules, for example, 802a, 802b, 802c, 802d, 802e, etc., of the image processing system 801. The instructions fetched by the processor 901 from the memory unit 902 after being processed are decoded. The instructions are stored in an instruction register in the processor 901. After processing and decoding, the processor 901 executes the instructions, thereby performing one or more processes defined by those instructions.

At the time of execution, the instructions stored in the instruction register are examined to determine the operations to be performed. The processor 901 then performs the specified operations. The operations comprise arithmetic operations and logic operations. The operating system performs multiple routines for performing a number of tasks required to assign the input devices 906, the output devices 909, and memory for execution of the modules, for example, 802a, 802b, 802c, 802d, 802e, etc., of the image processing system 801. The tasks performed by the operating system comprise, for example, assigning memory to the modules, for example, 802a, 802b, 802c, 802d, 802e, etc., of the image processing system 801, and to data used by the image processing system 801, moving data between the memory unit 902 and disk units, and handling input/output operations. The operating system performs the tasks on request by the operations and after performing the tasks, the operating system transfers the execution control back to the processor 901. The processor 901 continues the execution to obtain one or more outputs. The outputs of the execution of the modules, for example, 802a, 802b, 802c, 802d, 802e, etc., of the image processing system 801 are displayed to the user on the image display device 701.

For purposes of illustration, the detailed description refers to the image processing system 801 being run locally as a single computer system; however the scope of the computer implemented method and system 800 exemplarily illustrated in FIG. 8, disclosed herein is not limited to the image processing system 801 being run locally as a single computer system via the operating system and the processor 901, but may be extended to run remotely over the network by employing a web browser and a remote server, a mobile phone, or other electronic devices. One or more portions of the image processing system 801 may be distributed across one or more computer systems (not shown) coupled to the network.

Disclosed herein is also a computer program product comprising a non-transitory computer readable storage medium that stores computer program codes comprising instructions executable by at least one processor 901 for constructing and rendering an object oriented image of a target object in an original spatial position and an original orientation of the target object. The computer program product comprises a first computer program code for receiving an image of a target object being recorded, from the image recording device 304; a second computer program code for recording extended image data during recording of the image of the target object; a third computer program code for determining an original spatial position and an original orientation of the target object in a multi-dimensional space from the recorded extended image data; a fourth computer program code for constructing an object oriented image of the target object by repositioning and reorienting the received image of the target object being recorded, based on the determined original spatial position and the original orientation of the target object; and a fifth computer program code for rendering the constructed object oriented image of the target object in the determined original spatial position and the original orientation on the image display device 701.

The computer program product disclosed herein further comprises a sixth computer program code for obtaining supplementary information comprising physical dimensions of the target object, a three-dimensional (3D) image of the target object, time dependent spatial motion of the target object, and relative spatial relations between the image recording device 304 and the target object using the recorded extended image data; and a seventh computer program code for enhancing the recorded extended image data with the supplementary information. The computer program product disclosed herein further comprises an eighth computer program code for constructing a 3D object oriented image of the target object by repositioning and reorienting multiple images of the target object being recorded at multiple orientations, based on an original spatial position and an original orientation of the target object determined from the extended image data of the target object being recorded at each of the orientations. The computer program product disclosed herein further comprises a ninth computer program code for reconstructing the constructed 3D object oriented image of the target object in the determined original spatial position and the determined original orientation using a spatial relation and/or an orientation relation of the target object with respect to one or more surrounding objects proximal to the target object in the multi-dimensional space. The computer program product disclosed herein further comprises a tenth computer program code for integrating one or more supplementary 3D images of one or more surrounding objects with the reconstructed 3D object oriented image of the target object for generating an integrated 3D object oriented image of a 3D target scene.

The computer program product disclosed herein further comprises one or more additional computer program codes for performing additional steps that may be required and contemplated for constructing and rendering an object oriented image of a target object in an original spatial position and an original orientation of the target object. In an embodiment, a single piece of computer program code comprising computer executable instructions performs one or more steps of the computer implemented method disclosed herein for constructing and rendering an object oriented image of a target object in an original spatial position and an original orientation of the target object. The computer program codes comprising computer executable instructions are embodied on the non-transitory computer readable storage medium. The processor 901 of the image processing system 801 retrieves these computer executable instructions and executes them. When the computer executable instructions are executed by the processor 901, the computer executable instructions cause the processor 901 to perform the steps of the computer implemented method for constructing and rendering an object oriented image of a target object in an original spatial position and an original orientation of the target object.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Perl®, Python®, Visual Basic®, hypertext preprocessor (PHP), Microsoft®.NET etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises one or more computer program codes for implementing the processes of various embodiments.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for constructing and rendering an object oriented image of a target object in an original spatial position and an original orientation of said target object, said method employing an image processing system comprising at least one processor configured to execute computer program instructions for performing said method, said method comprising:

receiving an image of said target object being recorded, from an image recording device by said image processing system;

recording extended image data by said image processing system, in communication with said image recording device and one or more auxiliary devices, during recording of said image of said target object;

determining said original spatial position and said original orientation of said target object in a multi-dimensional space from said recorded extended image data by said image processing system;

constructing said object oriented image of said target object by said image processing system by repositioning and reorienting said received image of said target object being recorded, based on said determined original spatial position and said original orientation of said target object; and rendering said constructed object oriented image of said target object in said determined original spatial position and said original orientation on an image display device by said image processing system.

2. The computer implemented method of claim 1, wherein said extended image data comprises time of said recording of said image of said target object, spatial coordinates of said image recording device, multi-dimensional position and orientation of a line of vision of said image recording device, at least one of magnification and minimization of said image of said target object, and multi-dimensional spatial coordinates and spatial orientation of said target object being recorded by said image recording device.

3. The computer implemented method of claim 2, wherein said line of vision of said image recording device is a vector comprising spatial coordinates of an intersection of an imaging plane of said target object with a focal axis of said image recording device, and multi-dimensional spatial coordinates of a direction of said focal axis of said image recording device.

4. The computer implemented method of claim 1, further comprising obtaining supplementary information comprising physical dimensions of said target object, a three-dimensional image of said target object, time dependent spatial motion of said target object, and relative spatial relations between said image recording device and said target object by said image processing system, in communication with said image recording device and said one or more auxiliary devices, using said recorded extended image data, and enhancing said recorded extended image data with said supplementary information by said image processing system.

5. The computer implemented method of claim 1, further comprising configuring access elements on one or more regions of said rendered object oriented image of said target object by said image processing system, wherein said access elements, upon activation, are configured to render said one or more regions of said rendered object oriented image of said target object in one or more viewing windows for enhanced access to said one or more regions of said rendered object oriented image of said target object.

6. The computer implemented method of claim 1, wherein said constructed object oriented image of said target object is rendered as a two-dimensional image by said image processing system.

7. A computer implemented method for constructing and rendering a three-dimensional object oriented image of a target object in an original spatial position and an original orientation of said target object, said method employing an image processing system comprising at least one processor configured to execute computer program instructions for performing said method, said method comprising:

receiving a plurality of images of said target object being recorded at a plurality of orientations, from an image recording device by said image processing system;

recording extended image data at each of said orientations of said image recording device by said image processing system, in communication with said image recording device and one or more auxiliary devices, during recording of said images of said target object;

determining said original spatial position and said original orientation of said target object in a multi-dimensional space from said recorded extended image data by said image processing system;

constructing said three-dimensional object oriented image of said target object by said image processing system by repositioning and reorienting said received images of said target object being recorded, based on said determined original spatial position and said original orientation of said target object; and rendering said constructed three-dimensional object oriented image of said target object in said determined original spatial position and said original orientation on an image display device by said image processing system.

8. The computer implemented method of claim 7, wherein said extended image data comprises time of said recording of said images of said target object, two-dimensional image data of said target object, spatial coordinates of said image recording device at said each of said orientations, multi-dimensional position and orientation of a line of vision of said image recording device at said each of said orientations, at least one of magnification and minimization of each of said images of said target object, and multi-dimensional spatial coordinates and spatial orientation of said target object being recorded by said image recording device at said each of said orientations.

9. The computer implemented method of claim 8, wherein said line of vision of said image recording device is a vector comprising spatial coordinates of an intersection of an imaging plane of said target object with a focal axis of said image recording device, and multi-dimensional spatial coordinates of a direction of said focal axis of said image recording device.

10. The computer implemented method of claim 7, further comprising obtaining supplementary information comprising physical dimensions of said target object, a three-dimensional image of said target object, time dependent spatial motion of said target object, and relative spatial relations between said image recording device and said target object by said image processing system, in communication with said image recording device and said one or more auxiliary devices, using said recorded extended image data, and enhancing said recorded extended image data with said supplementary information by said image processing system.

11. The computer implemented method of claim 7, further comprising rendering said constructed three-dimensional object oriented image of said target object in said determined original spatial position and said original orientation by said image processing system using spatial coordinates of said image display device.

12. The computer implemented method of claim 7, further comprising reconstructing said constructed three-dimensional object oriented image of said target object in said determined original spatial position and said original orientation by said image processing system using one or more of a spatial relation and an orientation relation of said target object with respect to one or more surrounding objects proximal to said target object in said multi-dimensional space.

13. The computer implemented method of claim 12, further comprising integrating one or more supplementary three-dimensional images of said one or more surrounding objects with said reconstructed three-dimensional object oriented image of said target object by said image processing system for generating an integrated three-dimensional object oriented image of a three-dimensional target scene by said image processing system.

14. The computer implemented method of claim 7, further comprising generating and rendering views of said constructed three-dimensional object oriented image of said target object by said image processing system, wherein said views comprise an internal view and an external view.

15. The computer implemented method of claim 7, further comprising configuring access elements on one or more regions of said rendered three-dimensional object oriented image of said target object by said image processing system, wherein said access elements, upon activation, are configured to render said one or more regions of said rendered three-dimensional object oriented image of said target object in one or more viewing windows for enhanced access to said one or more regions of said rendered three-dimensional object oriented image of said target object.

16. An image processing system for constructing and rendering an object oriented image of a target object in an original spatial position and an original orientation of said target object, said image processing system comprising:
   a non-transitory computer readable storage medium configured to store computer program instructions defined by modules of said image processing system;
   at least one processor communicatively coupled to said non-transitory computer readable storage medium, said at least one processor configured to execute said defined computer program instructions;
   a data reception module configured to receive an image of said target object being recorded, from an image recording device;
   an extended image data processing module configured to record extended image data, in communication with said image recording device and one or more auxiliary devices, during said recording of said image of said target object;
   a positioning and orientation module configured to determine said original spatial position and said original orientation of said target object in a multi-dimensional space from said recorded extended image data;
   an image configuration module configured to construct said object oriented image of said target object by repositioning and reorienting said received image of said target object being recorded, based on said determined original spatial position and said original orientation of said target object; and
   an image rendering module configured to render said constructed object oriented image of said target object in said determined original spatial position and said original orientation on an image display device.

17. The image processing system of claim 16, wherein said extended image data comprises time of said recording of said image of said target object, spatial coordinates of said image recording device, multi-dimensional position and orientation of a line of vision of said image recording device, at least one of magnification and minimization of said image of said target object, and multi-dimensional spatial coordinates and spatial orientation of said target object being recorded by said image recording device.

18. The image processing system of claim 17, wherein said line of vision of said image recording device is a vector comprising spatial coordinates of an intersection of an imaging plane of said target object with a focal axis of said image recording device, and multi-dimensional spatial coordinates of a direction of said focal axis of said image recording device.

19. The image processing system of claim 16, wherein said extended image data processing module, in communication with said image recording device and said one or more auxiliary devices, is further configured to obtain supplementary information comprising physical dimensions of said target object, a three-dimensional image of said target object, time dependent spatial motion of said target object, and relative spatial relations between said image recording device and said target object using said recorded extended image data, and wherein said extended image data processing module is further configured to enhance said recorded extended image data with said supplementary information.

20. The image processing system of claim 16, wherein said image configuration module is further configured to construct a three-dimensional object oriented image of said target object by repositioning and reorienting a plurality of images of said target object being recorded at a plurality of orientations, based on an original spatial position and an original orientation of said target object, wherein said positioning and orientation module is further configured to determine said original spatial position and said original orientation of said target object in said multi-dimensional space from said extended image data of said target object being recorded at each of said orientations, and wherein said image rendering module is further configured to render said constructed three-dimensional object oriented image of said target object in said determined original spatial position and said original orientation on said image display device.

21. The image processing system of claim 20, wherein said image configuration module is further configured to reconstruct said constructed three-dimensional object oriented image of said target object in said determined original spatial position and said original orientation using one or more of a spatial relation and an orientation relation of said target object with respect to one or more surrounding objects proximal to said target object in said multi-dimensional space.

22. The image processing system of claim 21, wherein said image configuration module is further configured to integrate one or more supplementary three-dimensional images of said one or more surrounding objects with said reconstructed three-dimensional object oriented image of said target object for generating an integrated three-dimensional object oriented image of a three-dimensional target scene.

23. The image processing system of claim 20, wherein said image rendering module is further configured to render said constructed three-dimensional object oriented image of said target object in said determined original spatial position and said original orientation using spatial coordinates of said image display device.

24. The image processing system of claim 20, wherein said image configuration module is further configured to generate views of said constructed three-dimensional object oriented image of said target object, wherein said views comprise an internal view and an external view.

25. The image processing system of claim 16, wherein said image configuration module is further configured to configure access elements on one or more regions of said rendered object oriented image of said target object, wherein said access elements, upon activation, are configured to render said one or more regions of said rendered object oriented image of said target object in one or more viewing windows for enhanced access to said one or more regions of said rendered object oriented image of said target object.

26. A computer program product comprising a non-transitory computer readable storage medium, said non-transitory computer readable storage medium storing computer program codes that comprise instructions executable by at least one processor, said computer program codes comprising:
- a first computer program code for receiving an image of a target object being recorded, from an image recording device;
- a second computer program code for recording extended image data during recording of said image of said target object, wherein said extended image data comprises time of said recording of said image of said target object, spatial coordinates of said image recording device, multi-dimensional position and orientation of a line of vision of said image recording device, at least one of magnification and minimization of said image of said target object, and multi-dimensional spatial coordinates and spatial orientation of said target object being recorded by said image recording device;
- a third computer program code for determining an original spatial position and an original orientation of said target object in a multi-dimensional space from said recorded extended image data;
- a fourth computer program code for constructing an object oriented image of said target object by repositioning and reorienting said received image of said target object being recorded, based on said determined original spatial position and said original orientation of said target object; and
- a fifth computer program code for rendering said constructed object oriented image of said target object in said determined original spatial position and said original orientation on an image display device.

27. The computer program product of claim 26, further comprising:
- a sixth computer program code for obtaining supplementary information comprising physical dimensions of said target object, a three-dimensional image of said target object, time dependent spatial motion of said target object, and relative spatial relations between said image recording device and said target object using said recorded extended image data; and
- a seventh computer program code for enhancing said recorded extended image data with said supplementary information.

28. The computer program product of claim 26, further comprising an eighth computer program code for constructing a three-dimensional object oriented image of said target object by repositioning and reorienting a plurality of images of said target object being recorded at a plurality of orientations, based on an original spatial position and an original orientation of said target object determined from said extended image data of said target object being recorded at each of said orientations.

29. The computer program product of claim 28, further comprising a ninth computer program code for reconstructing said constructed three-dimensional object oriented image of said target object in said determined original spatial position and said original orientation using one or more of a spatial relation and an orientation relation of said target object with respect to one or more surrounding objects proximal to said target object in said multi-dimensional space.

30. The computer program product of claim 29, further comprising a tenth computer program code for integrating one or more supplementary three-dimensional images of said one or more surrounding objects with said reconstructed three-dimensional object oriented image of said target object for generating an integrated three-dimensional object oriented image of a three-dimensional target scene.

\* \* \* \* \*